United States Patent [19]

Jüntgen et al.

[11] 4,201,695
[45] May 6, 1980

[54] ARRANGEMENT FOR REGENERATING PARTICULATE ADSORBENTS

[75] Inventors: Harald Jüntgen; Karl Knoblauch, both of Essen; Horst Grochowski, Oberhausen; Jürgen Schwarte, Essen, all of Fed. Rep. of Germany

[73] Assignee: Bergwerksverband GmbH, Essen, Fed. Rep. of Germany

[21] Appl. No.: 854,528

[22] Filed: Nov. 25, 1977

Related U.S. Application Data

[63] Continuation of Ser. No. 720,081, Sep. 2, 1976, abandoned.

[30] Foreign Application Priority Data

Sep. 4, 1975 [DE] Fed. Rep. of Germany ....... 2539266

[51] Int. Cl.² ................. B01J 21/20; B01J 37/00; B01D 15/06
[52] U.S. Cl. ............................ 252/411 R; 34/9; 34/165; 34/174; 55/79; 422/216; 432/27; 432/215
[58] Field of Search ............. 252/411 R, 411 S, 418; 422/216; 34/9, 165, 174; 432/215, 27; 201/12, 20, 34; 55/474, 79

[56] References Cited

U.S. PATENT DOCUMENTS

| 2,493,218 | 1/1950 | Bergstrom | 34/174 |
| 2,506,545 | 5/1950 | Crowley, Jr. | 252/418 |
| 2,671,057 | 3/1954 | McClure | 34/174 |
| 2,732,331 | 1/1956 | Wesh | 23/288 G |
| 3,559,296 | 2/1971 | Dratwa et al. | 34/9 |

Primary Examiner—P. E. Konopka
Attorney, Agent, or Firm—Michael J. Striker

[57] ABSTRACT

A reaction vessel for regenerating particulate adsorbents has a bottom outlet and top inlets for admission of the adsorbent to be regenerated by being heated to a regeneration temperature, and for a particulate regenerating material at a temperature above the regeneration temperature. The mixture of the adsorbent with the regenerating material forms a bed in the reaction vessel and is continuously withdrawn through the outlet so that the bed descends toward the latter and is replenished from above under the formation of a cone at the upper region of the bed. A plurality of tubular baffles coaxially surrounds the inlets which are also coaxial with one another, each of the tubular baffles penetrating into the bed in the region of the cone and retards the flow of the particles of the mixture down the slope of the cone in that the particles must pass underneath the baffle to flow to the next baffle. The bed may be confined between a plurality of axially overlapping spaced tubular guide baffles located in the interior of the reaction vessel with a spacing therefrom. At least one partition may be provided between one of the guide baffles and the vessel, subdividing the chamber between the vessel and the guide baffles into two compartments from which gases which develop during the regeneration of the adsorbent are separately exhausted.

2 Claims, 2 Drawing Figures

ARRANGEMENT FOR REGENERATING PARTICULATE ADSORBENTS

This is a continuation, of application Ser. No. 720,081, filed Sept. 2, 1976, now abandoned.

BACKGROUND OF THE INVENTION

The present invention relates to a reaction vessel, and particularly to a reaction vessel which is suited for regenerating adsorbents. There is already known a wide variety of reaction vessels of different types, sizes, shapes and for different purposes. The present invention is concerned with that type of a reaction vessel in which a mixture of particles of at least two materials having different bulk densities is to be confined in form of a bed which continuously or intermittently advances to a lower outlet through which it is withdrawn or discharged, and which is continuously replenished by the two materials from above under the formation of a cone at the upper region of the bed.

The vessels of this type are particularly suited for the regeneration of absorbents which have been previously used for adsorbing deleterious or noxious substances from different media, such as gases or liquids, and which have been charged with such substances. Such adsorbents, such as activated carbon or other carbon-containing substances, can be regenerated so as to regain their original adsorbing properties, by being heated to or above a regeneration temperature. Among the methods which can be used for heating the charged adsorbent to the regeneration temperature is the one which is utilized in the arrangement of the present invention, which resides in mixing the charged adsorbent with a particulate regenerating material which is at a temperature higher than the regeneration temperature needed for regenerating the adsorbent. Obviously, upon admixing the particles of the adsorbent with those of the regenerating material, such as, for instance, sand, heat exchange will take place between the particles, as a result of which the particles of the adsorbents are brought up to or above the regeneration temperature and the adsorbed substances are expelled therefrom and escape from the bed in the form of gases.

A vessel of this type is already known, and has a lower outlet for the mixture of the regenerating material with the regenerated adsorbent through which the mixture is discharged to be subsequently separated into its components, if so desired, for separate re-use. This separation, if contemplated, is performed in a conventional manner and will not be discussed. The conventional reaction vessel of this type has two coaxial upper inlets, one for the charged adsorbent to be regenerated, and the other for the regenerating material, through which these particulate materials are admitted into the interior of the reaction vessel and on top of the bed of the mixture which is confined in the reaction vessel and gradually descends toward the outlet as the mixture is being discharged through the bottom outlet. The bed is continuously replenished with the two materials through the two inlets, and a cone forms at the upper region of the bed, the slope of which cone will depend on the angle of repose, or, in other words, on the friction between the particles, of the two materials.

One of the most important requirements of such reaction vessels is that the two materials be thoroughly and intimately admixed with one another, which is a very difficult goal to achieve in view of the fact that the particles of the two materials have different bulk densities or specific weights, because heat exchange is to take place between the particles of the two materials, and because gases are liberated from the particles of the adsorbent being regenerated or desorbed. A uniform distribution of the adsorbent which is to be heated to the regeneration temperature in the particulate heat carrier, such as hot sand, is imperative in order to achieve a uniform temperature distribution throughout the bed and thereby a uniform and complete regeneration or desorption of the adsorbent.

Experience with the above-described conventional reaction vessel has shown that it is possessed of several disadvantages. One of the main drawbacks of such a reaction vessel is that the flow of the particles of the two materials in all directions within the reaction vessel is unimpeded. This, in turn, brings about other disadvantages. First of all, the particles of the charged replenishment adsorbent do not readily become immersed into the bed once they are introduced into the reaction vessel at the top of the above-mentioned cone at the top of the bed. This situation is attributable to the fact that the particles of the adsorbent have a lower specific weight than the particles of the regenerating material, so that they will naturally tend to remain at the surface of the cone. Secondly, as the bed descends toward the bottom outlet, and the regenerating material and the adsorbent are being replenished from above, the particles of the adsorbent and of the regenerating material will flow down the slope of the previously formed conical upper region of the bed, during which downward and radial flow the adsorbent particles, due to their low specific weight, will tend to float toward the upper surface of the conically shaped upper region of the bed. Furthermore, as already mentioned above, gases are being desorbed from the particles of the adsorbent during the regeneration of the latter, which gases are collected above the upper surface of the bed, after having flown through the bed from the lower regions thereof in countercurrent to the descent of the bed toward the outlet. This counterflow of the gases by itself will tend to entrain the lighter particles of the adsorbent and carry them with itself toward the upper surface of the conical upper region of the bed. In addition thereto, the penetration of the gases which have been desorbed from the adsorbent particles through the bed, and the escape of such gases from the bed into the gas-collection space from which the gases are withdrawn or exhausted results in the formation of turbulent flow conditions at the upper surface of the conical upper region of the bed which further enhances the rising of the low specific weight adsorbent particles to the upper surface of the conical upper region of the bed. These turbulent conditions with attendant formation of stray and eddy currents will tend to de-mix rather than admix the particles of different bulk densities. The net result of the above-discussed conditions in the interior of the reaction vessel is that the absorbent particles will have a tendency to accummulate at the upper surface of the conical region of the bed, and slide over such upper surface in the radially outward direction more readily than the particles of the regenerating material. Thus, a larger concentration of the adsorbent particles will be found at the foot of the conical upper region of the bed than in any other region, such a concentration being much higher than that which would correspond to the statistical distribution, and is also much higher than what would correspond to the relative amounts of replenishment adsorbent and replenishment heat-carrying regenerating material. This situation is disadvantageous in two respects. On the one hand, proportionately less regenerating material is available for heating the adsorbent in the radially outward regions of the bed, owing to the higher concentration of the adsorbent in the mixture in such regions. On the other hand, heat exchange will also take place between the regenerating material and the walls of the reaction vessel in such radially outward regions, so that even less heat is available for regenerating the adsorbent particles in such radially outward regions than there is in the inward regions of the bed. For these reasons, it is necessary, in the conventional reaction vessel, to use an inordinate amount of heat for regenerating the adsorbent even in the radially outward regions of the bed by either introducing disproportionately large quantities of the heat-carrying regenerating material, or by heating such regeneration material to a much higher temperature than actually necessary. When this is done, the energy consumption of the reaction vessel is substantially higher than that which would be otherwise needed if the concentration of the adsorbent were uniform throughout the bed. On the other hand, if only such an amount of energy was introduced into the vessel which corresponds to the statistical distribution of the adsorbent and regeneration material particles, the regeneration or desorption operation would be less than complete by the time of discharge or withdrawal of the mixture through the bottom of the vessel.

SUMMARY OF THE INVENTION

Accordingly, it is a general object of the present invention to avoid the disadvantages of the prior art.

More particularly, it is an object of the present invention to provide a reaction vessel for the regeneration of particulate adsorbents which is not possessed of the disadvantages of the prior-art reaction vessels.

It is a further object of the present invention to devise a reaction vessel in which an advancing and constantly replenished bed is confined which consists of particles of the charged adsorbent and the regenerating material, in which the particles are uniformly distributed throughout the bed. It is still another object of the present invention to provide a reaction vessel of the type here under consideration which is simple in construction and reliable in operation. A concomitant object of the present invention is to provide a reaction vessel in which the interior space of the vessel is better utilized than in similar vessels of the prior art.

A specific object of the present invention is to construct a reaction vessel in such a manner that an intimate mixture of particles of at least two materials having different specific densities can be obtained therein.

In pursuance of these objects and others which will become apparent hereafter, one feature of the present invention resides, briefly stated, in an arrangement for regenerating particulate adsorbents, which comprises means for confining a bed of a mixture of an adsorbent to be regenerated with a particulate regenerating material; means for withdrawing the mixture from the bed at a lower region thereof, thereby inducing downward flow of the mixture through the confining means toward the withdrawing means; means for replenishing the bed with additional adsorbent to be regenerated and with fresh regenerating material from above so that an upper region of the bed assumes a conical shape; and means for retarding the flow of the adsorbent and the regenerating material radially along the conical upper region of the bed, including at least one tubular baffle in the confining means radially outwardly of the replenishing means and penetrating into the conical upper region of the bed. By providing the tubular baffle obstructing the flow of the particles in the radially outward direction, an intimate mixture of the particles of the adsorbent and of the regenerating material is obtained during their flow underneath the tubular baffle.

Surprisingly, it has been established that, because of the retardation of the flow of the particles by the baffle, and because of the diversion of flow of the particles, particularly those of the relatively heavier particles of the heat-carrying regenerating material, in the downward direction, the relatively low specific weight particles of the adsorbent are entrained by the particles of the regenerating material for joint flow in the downward direction and continue to travel therewith throughout the bed. Thus, an intimate mixture of the particles of the adsorbent with those of the regenerating material is obtained right at the summit of the conical upper region of the bed, due to the confinement, retardation and diversion of the flow of the particles by the tubular baffle, such mixing taking place despite the fact that the sand or other regenerating material is considerably fluidized by the spontaneous gas generation during the desorption or regeneration process and the escape of such gas from the bed. This is even more surprising in view of the fact that the flow of the liberated gases through the bed in countercurrent to the descent of the bed results in a situation ordinarily more inductive of segregation of the particles of different specific densities and upward movement of the particles having the lower bulk weight.

Depending on the difficulty encountered when mixing the two materials with one another, one or more tubular baffles may be arranged along the slope of the conical upper region of the bed, each of the baffles penetrating into the bed, and the outer tubular baffles coaxially surrounding the inner tubular baffles, being offset therefrom in the downward direction along the slope of the conical upper region of the bed. The tubular baffle or the tubular baffles are so arranged that they project at least approximately 10 cm above the upper surface of the conical upper region of the bed, and penetrate to a depth of approximately 10 to 50 cm below the upper surface of the conical upper region of the bed. The extent of projection of the baffle or baffles above the upper surface of the conical upper region of the bed has only a limited practical significance in that the only function which such projecting portions of the baffles have to perform is to prevent the flow of the mixture over the baffle. Thus, the baffles could extend above the conical upper region of the bed to even a much greater extent, but this would be impractical because it would involve unnecessary additional material expenditure. On the other hand, the penetration of the baffles into the conical upper region of the bed to a depth of approximately 10 to 50 cm is essential and has been found to be very advantageous for enhancing the intimate mixing of the particles of the two materials.

According to a currently preferred embodiment of the present invention, and as already mentioned above, the absorbent is regenerated by being heated to a regeneration temperature, and the regenerating material is introduced into the interior of the vessel at a temperature which exceeds the regeneration temperature of the absorbent.

According to a further aspect of the present invention, the replenishing means includes one pipe for the adsorbent, and another pipe for the regenerating material, these pipes having open ends which open on the upper region of the bed, one of the pipes coaxially surrounding the other pipe.

The gases which are generated or liberated during the regeneration process penetrate in counterflow through the bed and are accumulated in the upper region of the vessel above the conical upper region of the bed. These gases may then be withdrawn, exhausted or discharged from the collecting space above the upper surface of the conical region of the bed. In this embodiment, the confining means is constituted by the reaction vessel proper. However, according to a further development of the basic concept of the present invention, the confining means may be constituted by a plurality of guide baffles which overlap one another in the direction of flow of the mixture, the guide baffles being tubular and spaced from one another transversely of the abovementioned direction. The reaction vessel may then surround the guide baffles, and the abovementioned gas-exhausting means may communicate with the interior of the vessel outside of the confining means.

In this embodiment, the guide baffles and the reaction vessel define with one another a gas-collection chamber. Partitioning means may then be arranged in the gas-collection chamber, which extends between the guide baffles and the reaction vessel and subdividing the gas-collection chamber into at least two compartments. Under these circumstances, the gas-exhausting means may include conduits which individually communicate with each of the compartments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DISCUSSION OF THE PREFERRED EMBODIMENTS

Figure 1:
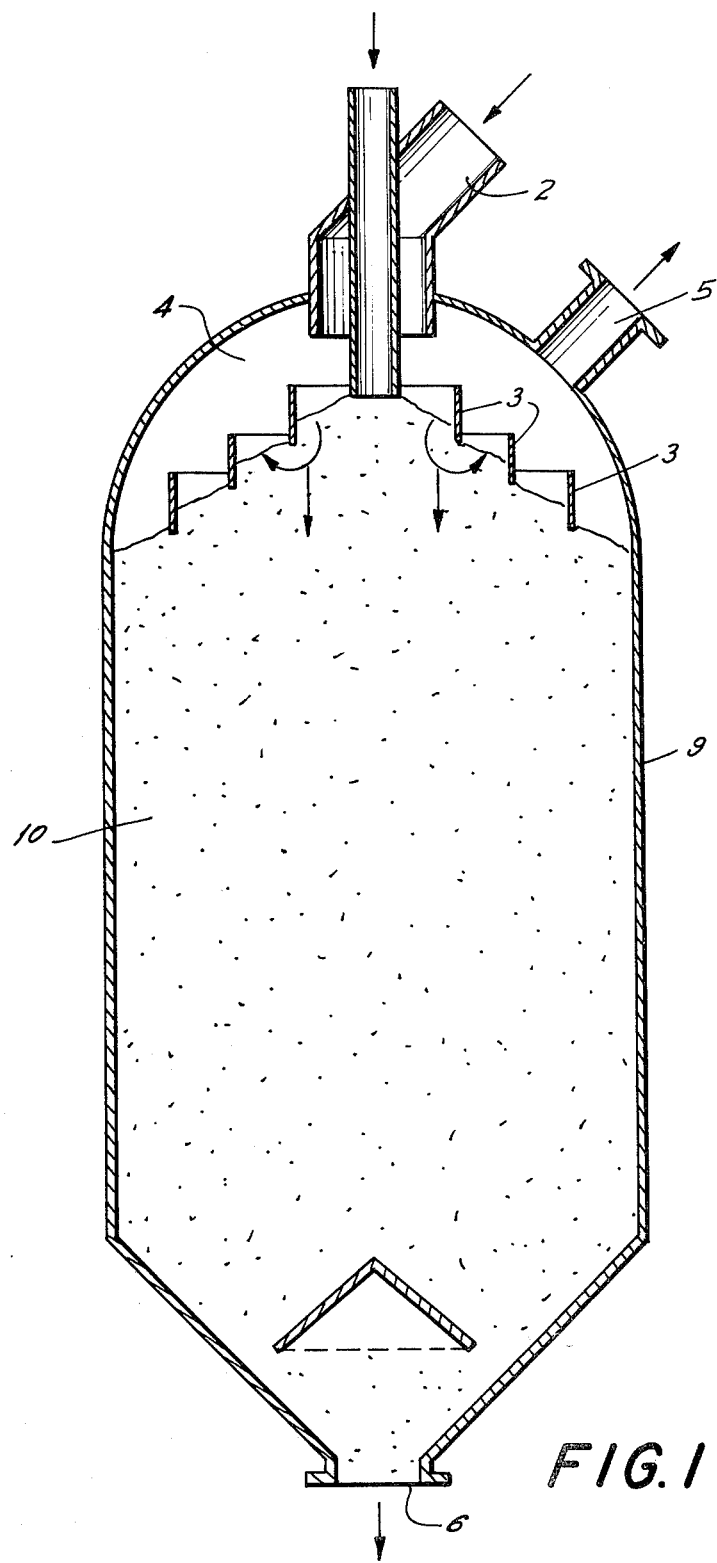
FIG. 1 is a somewhat diagrammatic sectional view of a reaction vessel equipped with the baffles of the present invention.

Referring now to the drawing in detail, and first to FIG. 1 thereof, it may be seen that a reaction vessel of a conventional construction has been designated with a reference numeral 9. The reaction vessel 9 has a bottom outlet 6 through which a bed 10 of a mixture of an adsorbent with a heat-carrying regenerating material is accommodated during the regenerating operation. The mixture of the bed 10 is continuously or intermittently discharged from the interior of the vessel 9 through the bottom outlet 6, and the bed 10 is continuously or intermittently replenished from above with charged adsorbent to be regenerated and with fresh regenerating material of particulate consistency which is heated to a temperature exceeding the regeneration temperature of the particulate adsorbent. For this purpose, two coaxial pipes 1 and 2 are arranged at the top of the reaction vessel 9, through which the adsorbent and the particulate material are continuously or intermittently introduced into the interior of the vessel 9. It is currently preferred that the adsorbent be introduced through the pipe 2, while the regenerating material is admitted via the pipe 1, but it is to be understood that the function of these two pipes 1 and 2 can be reversed without any detrimental results. The vessel 9 further has a gasexhaust port 5 which communicates with the interior of the vessel, and particularly with a gas-collection chamber 4 above the upper surface of the bed 10, the gases which develop or are generated during the desorption or regeneration operation being collected in the chamber 4 and being exhausted from the interior of the vessel 9 through the port 5.

As illustrated in FIG. 1, three tubular baffles 3 are arranged in the interior of the reaction vessel 9 and concentrically surround the pipes 1 and 2 and, in turn, one another, being downwardly spaced from the pipes 1 and 2 and from one another and distributed along a cone which forms at the upper region of the bed 10 as a result of the central admission of the adsorbent and of the regenerating material through the pipes 1 and 2, respectively. The baffles 3 penetrate into the conical upper region of the bed 10 to an extent of 10 to 50 cm, and extend to some extent, such as by 10 cm, above the upper surface of the conical region of the bed 10. The baffles 3 are mounted in the interior of the vessel 9 in any conventional, non-illustrated, manner, such as by being suspended from the top of the vessel 9, or by being connected to one another and to the lateral walls of the vessel 9 by spoke-resembling connecting elements, or in any similar manner.

The reaction vessel 9 operates in the following manner:

The hot sand or other heat-carrying regenerating material, and the adsorbent to be regenerated, are introduced into the interior of the vessel through the pipes 1 and 2. These materials have a tendency to form a cone at the upper region of the bed 10 and the slope of which corresponds to the angle of repose of the mixture of these two materials.

The concentric tubular baffles 3 are immersed to a certain extent into the conical upper portion of the bed. Thus, as the bed 10 descends as a result of discharge of the mixture of the regenerating material with the regenerated adsorbent through the bottom outlet 6, the particles of the regenerating material and of the adsorbent being regenerated flow in a generally downward direction through the space radially delimited by the inner one of the baffles 3. Since all of the particulate material is introduced into this space from the pipes 1 and 2, the speed of downward advancement of the particles is much higher in this space than in the remainder of the bed 10. As a result of this, the relatively heavy particles of the regenerating material will entrain and carry with them the particles of the relatively light adsorbent in the general downward direction and also, at a high speed, underneath the innermost tubular baffle 3 into the space bounded by the same and the next following baffle 3. Such flow of the particles is indicated in FIG. 1 by arrows.

This process of entrainment for downward movement and of circumventing the baffle 3 underneath the same is repeated from baffle to baffle with gradually decreasing speed, proportionately to the increasing diameter of the baffles. Thus, if any of the articles of the adsorbent float to the surface of the conical portion between any two of the baffles 3, such particles are agan entrained by the particles of the regenerating material for joint downward movement therewith and for movement therewith around the next-succeeding baffle 3.

Figure 2:
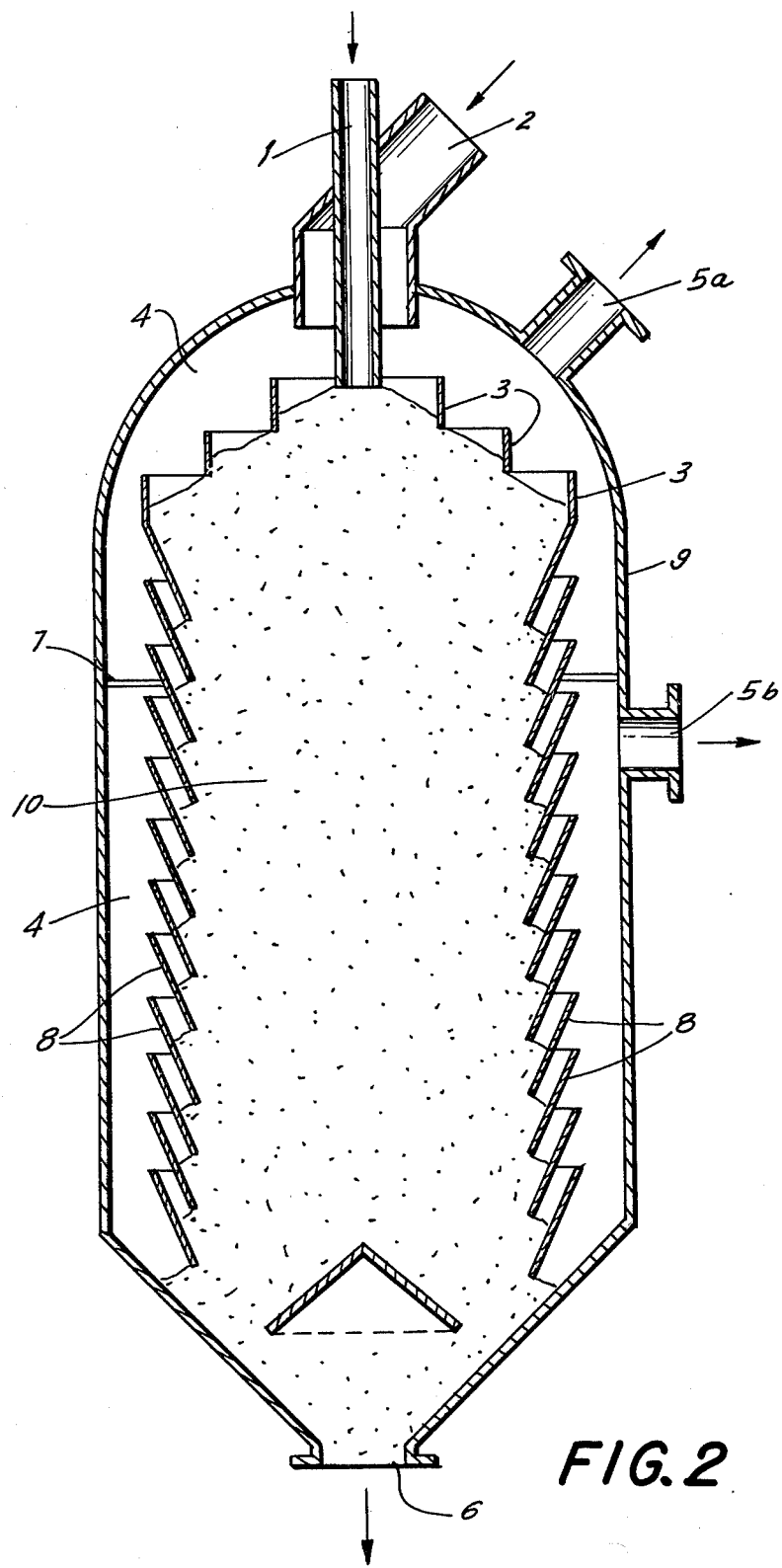
FIG. 2 is a view similar to FIG. 1 but additionally showing guide baffles and a partition.

The reaction vessel 9 of FIG. 2 is in many respects similar to that described above in connection with FIG. 1 so that the same reference numerals have been used to designate the same parts. Thus, for instance, the reaction vessel 9, the pipes 1 and 2, the tubular baffles 3 and the bottom outlet 6 are exactly the same as those of FIG. 1. Here again, the bed 10 of the mixture of the adsorbent with sand or similar regenerating and heat-carrying material travels through the interior of the vessel in a generally downward direction toward the bottom outlet 6. However, unlike in FIG. 1 where the vessel 9 itself constituted the confining means for the bed 10, in the embodiment of FIG. 2 such confining means is constituted by a plurality of guide baffles 5 which overlap one another in the direction of advancement of the bed 10, are inclined so as to converge in the downward direction of the vessel 9, and are spaced from one another in the radial direction of the vessel 1. Here again, the guide baffles 5 are connected to the vessel 9 and/or to one another by non-illustrated conventional supporting means.

As a result of the provision of the guide baffles or louvers 5 the gas-collection chamber 4 is located not only above the upper surface of the bed 10, but also in the interspace between the vessel 9 and the guide baffles 5. In this manner, a substantially greater surface area of the bed 10 is available for escape of the gases which are liberated during the regeneration of the adsorbent than that present in the embodiment of FIG. 1.

At least one petitioning wall 7 may extend between the vessel 9 and one of the guide vessels 5, separating the gas-collection chamber 4 into two compartments. Different gases will develop in the bed 10 at different regions of the bed 10, depending on the progress of the regeneration or desorption operation. Such gases escape through the gaps between the guide baffles 5 into one of the compartments of the chamber 4, and the composition or mixture of the gases will be different in each of the compartments of the gas-collecting chamber 4 because of the presence of the partitioning wall 7 between the two compartments. The quality of the two gaseous media in the two compartments may be selected by properly positioning the partitioning wall 7 at the desired elevation of the vessel 9.

The gases or other substances which have been previously adsorbed by the adsorbent may have been detrimental or noxious in the process in which the adsorbent has been used for removing such substances. This, however, does not mean that the gases liberated from the adsorbent during the regeneration thereof are useless in any applications. Rather, such gases may be used in other processes or may be recycled or the like, or at least some of such gases, which makes the provision of the partitioning wall 7 particularly advantageous since it helps in separating gases of different qualities from one another, one of the gaseous mixtures being withdrawn from the exterior of the vessel 9 through an exhaust port 5a, while the other gaseous mixture is withdrawn by means of the exhaust port 5b, and each of such mixtures may then be treated or used separately.

While the present invention has been described as embodied in a cylindrical vessel, it is to be understood that the vessel 9 may have any other, such as square or rectangular, cross section. Also, the baffles 3 and 5 need not be circular or annular, nor need they be circumferentially complete. In other words, the annular baffles 3 and/or 5 may be partially formed by the walls of the vessel 9.

It is to be understood that the reaction vessel of the present invention is not exclusively suited for the regeneration of adsorbents; rather, it may be used for performing any processes in which an intimate mixture of particles of different specific weights is to be achieved, and particularly in all such processes which one particulate material is to be heated or, for that matter, cooled, by using a heat or cold carrying solid material.

It will be understood that each of the elements described above, or two or more together, may also find a useful application in other types of constructions differing from the types described above.

While the invention has been illustrated and described as embodied in a reaction vessel for regenerating adsorbents, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for regenerating particulate adsorbents, comprising confining a bed of a mixture of an adsorbent to be regenerated with a particulate regenerating material; withdrawing the mixture from the bed at a lower withdrawal region thereof, thereby inducing a downward flow of the mixture through the confined bed toward the withdrawal region; replenishing said bed with additional adsorbent to be regenerated and with fresh regenerating material from above, so that an upper region of the bed assumes a conical shape; and retarding the flow of the adsorbent and the regenerating material radially along the conical upper region of the bed, using at least two substantially concentric axially staggered tubular baffles radially outward of the location at which replenishing adsorbent is furnished and penetrating to different depths into the conical upper region of the bed, whereby an intimate mixture of the particles of the adsorbent and of the regenerating material is obtained during their flow underneath the baffles.

2. A method for regenerating particulate adsorbents, comprising confining a bed of a mixture of an adsorbent to be regenerated with a particulate heat-exchange regenerating material; withdrawing the mixture from the bed at a lower withdrawal region thereof, thereby inducing a downward flow of the mixture through the confined bed toward the withdrawl region; replenishing said bed with additional adsorbent to be regenerated and with fresh heat-exchange regenerating material from above so that an upper region of the bed assumes a conical shape; and retarding the flow of the adsorbent and the heat-exchange regenerating material radially along the conical upper region of the bed, using at least two substantially concentric axially staggered tubular baffles radially outward of the location at which replenishing adsorbent is furnished and penetrating to different depths into the conical upper region of the bed, whereby an intimate mixture of the particles of the adsorbent and of the heat-exchange regenerating material is obtained during their flow underneath the baffles.

* * * * *